(12) United States Patent
Ragsdale, Jr.

(10) Patent No.: US 9,783,944 B2
(45) Date of Patent: Oct. 10, 2017

(54) BERM OR LEVEE EXPANSION SYSTEM AND METHOD

(71) Applicant: Larry Ragsdale, Jr., Webster, TX (US)

(72) Inventor: Larry Ragsdale, Jr., Webster, TX (US)

(*) Notice: Subject to any disclaimer, the term of this patent is extended or adjusted under 35 U.S.C. 154(b) by 50 days.

(21) Appl. No.: 14/731,553

(22) Filed: Jun. 5, 2015

(65) Prior Publication Data

US 2015/0354160 A1 Dec. 10, 2015

Related U.S. Application Data

(60) Provisional application No. 62/008,662, filed on Jun. 6, 2014.

(51) Int. Cl.
*E02B 3/10* (2006.01)
*E02D 17/18* (2006.01)
*E02B 3/12* (2006.01)

(52) U.S. Cl.
CPC ............. *E02B 3/10* (2013.01); *E02B 3/126* (2013.01)

(58) Field of Classification Search
CPC ............. E02D 17/18; E02D 7/06; E02B 3/10
See application file for complete search history.

(56) References Cited

U.S. PATENT DOCUMENTS

| | | | | |
|---|---|---|---|---|
| 4,521,131 A | * | 6/1985 | Nandlal | E02B 3/10 405/116 |
| 4,555,201 A | * | 11/1985 | Paoluccio | E02B 3/108 405/117 |
| 5,605,416 A | | 2/1997 | Roach | |
| 5,882,144 A | * | 3/1999 | Lemperiere | E02B 7/16 405/102 |
| 5,992,104 A | | 11/1999 | Hudak | |
| 6,012,872 A | | 1/2000 | Perry et al. | |
| 8,376,657 B2 | * | 2/2013 | Dudding | E02D 31/002 405/129.57 |
| 8,430,600 B2 | | 4/2013 | Dudding | |
| 8,845,240 B2 | * | 9/2014 | Dudding | B09B 1/00 405/129.45 |
| 2009/0050025 A1 | * | 2/2009 | Wissa | C04B 28/143 106/786 |
| 2011/0135394 A1 | | 6/2011 | Dudding | |

(Continued)

FOREIGN PATENT DOCUMENTS

| FR | WO 9739195 A1 | * | 10/1997 | ............ E01C 3/006 |
|---|---|---|---|---|
| JP | 2006045814 A | * | 2/2006 | ............ E02B 7/06 |
| KR | 20110028213 A | * | 3/2011 | |

*Primary Examiner* — Benjamin Fiorello
(74) *Attorney, Agent, or Firm* — David McEwing

(57) ABSTRACT

A system and method to create or elevate a berm of a liquid retention facility by placement of lightweight fill material anchored by an impervious liner material(s). The impervious liner material is integral to a water retention system such as a containment system of a retention pond. The system and method can also be used to elevate the liquid retention height of a levee in combination with impervious liner retention material. By constructing the berm system on an existing levee, the effective height of the levee can be increased. The lightweight fill material provides the shape of the berm or levee extension. The liquid impervious liner material provides a watertight surface, the media for joining of the lightweight fill material, and the anchoring of the lightweight fill material to the existing berm or levee structure.

20 Claims, 14 Drawing Sheets

TYPICAL SECTION OF EMBODIMENT—A

(56) References Cited

U.S. PATENT DOCUMENTS

| | | |
|---|---|---|
| 2012/0201606 A1 | 8/2012 | Dudding |
| 2012/0237299 A1 | 9/2012 | Dudding |
| 2012/0269577 A1* | 10/2012 | Christensen .............. E02B 3/10 405/115 |
| 2013/0089376 A1* | 4/2013 | Nolt ......................... B65G 5/00 405/53 |
| 2013/0121768 A1 | 5/2013 | Powell et al. |
| 2013/0129420 A1 | 5/2013 | Dudding |
| 2015/0191888 A1* | 7/2015 | Karsten ............... E02D 29/0233 405/262 |

* cited by examiner

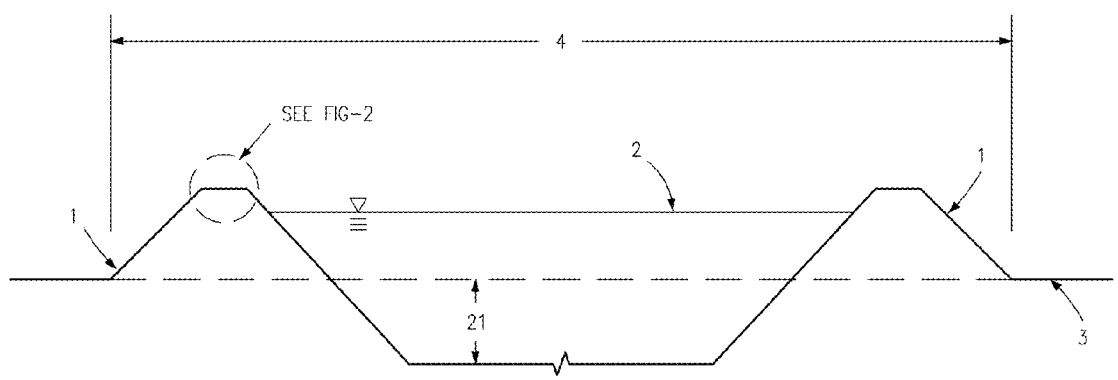
FIG-1 CROSS SECTION OF TYPICAL CONTAINMENT POND

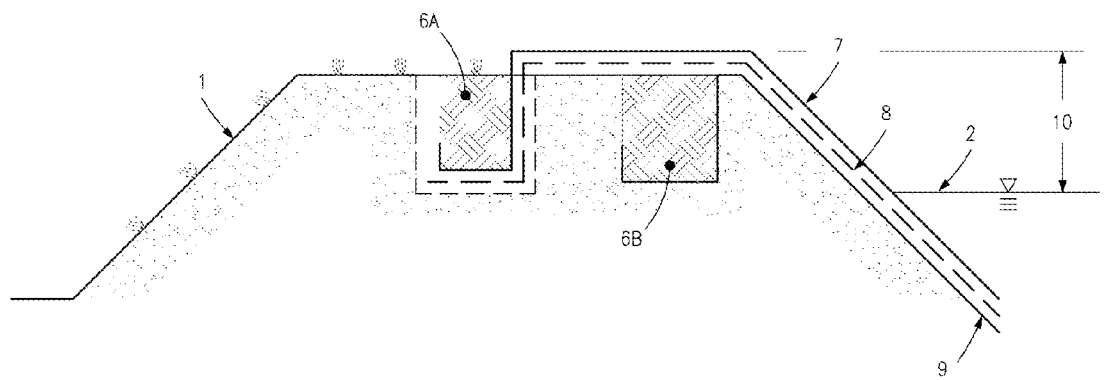
FIG-2 TYPICAL SECTION OF DOUBLE LINED LEVEE

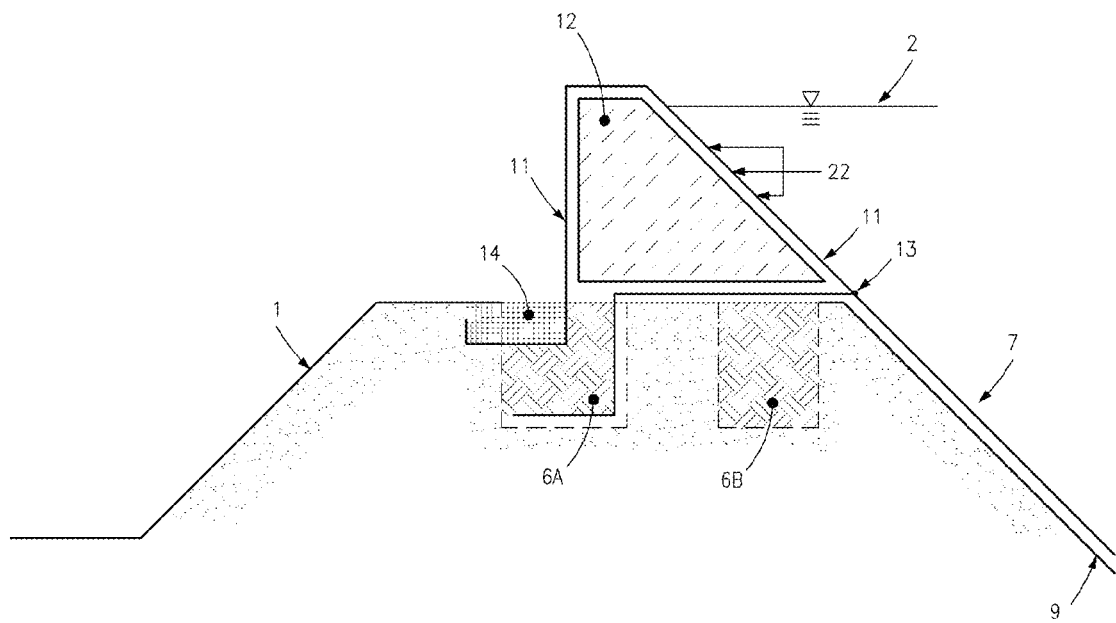
FIG-3 TYPICAL SECTION OF EMBODIMENT-A

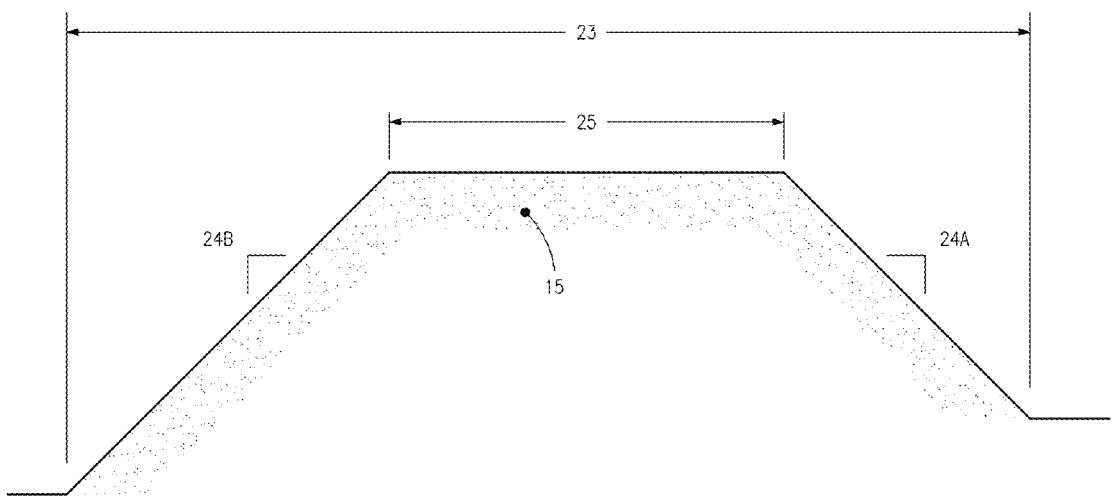
FIG-4 TYPICAL SECTION OF EXISTING EARTHEN LEVEE

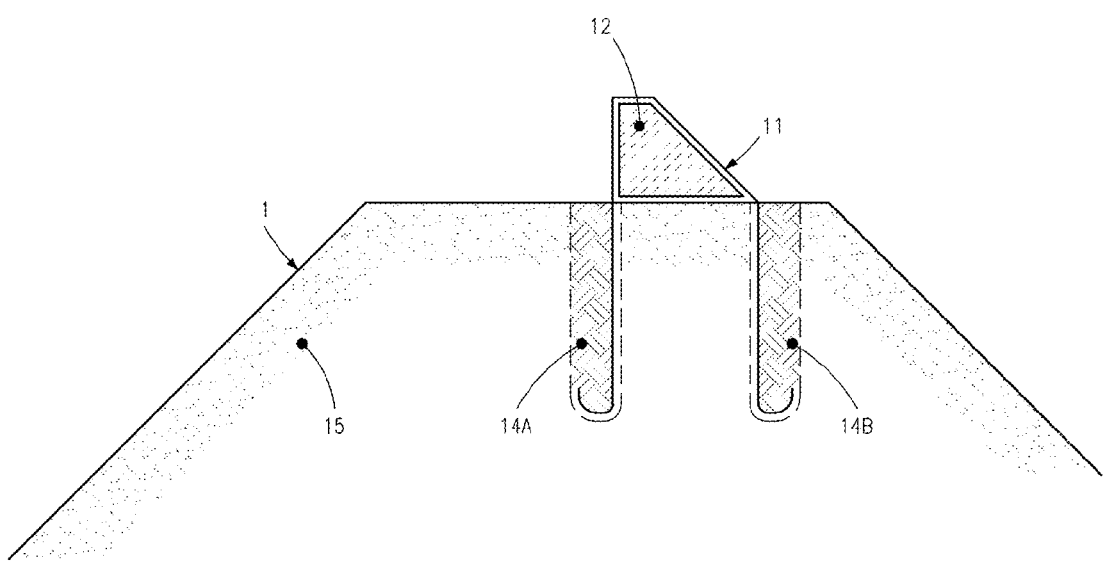
FIG-5 TYPICAL SECTION OF EMBODIMENT-B

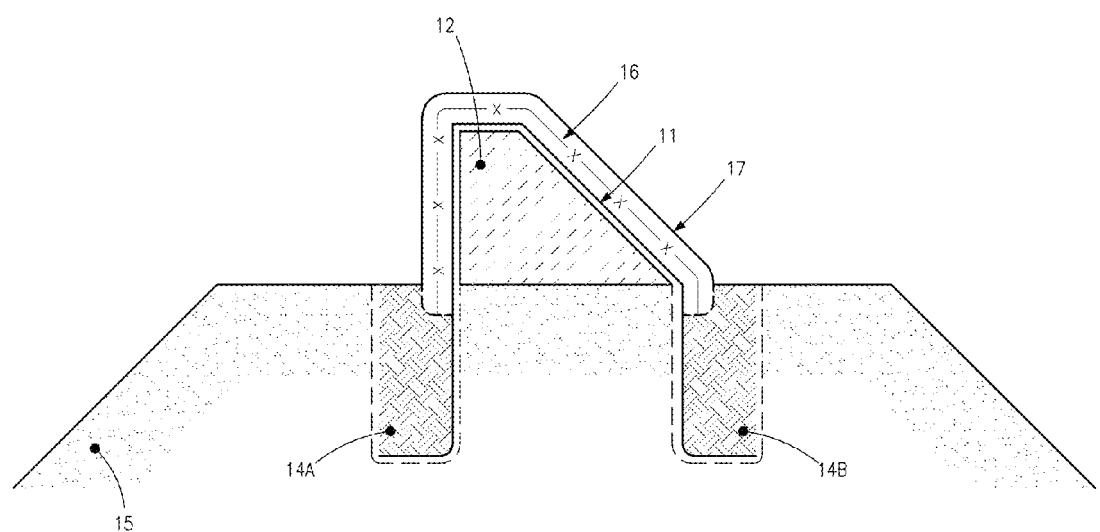
FIG-6 TYPICAL SECTION. EMBODIMENT-B. ARMORED

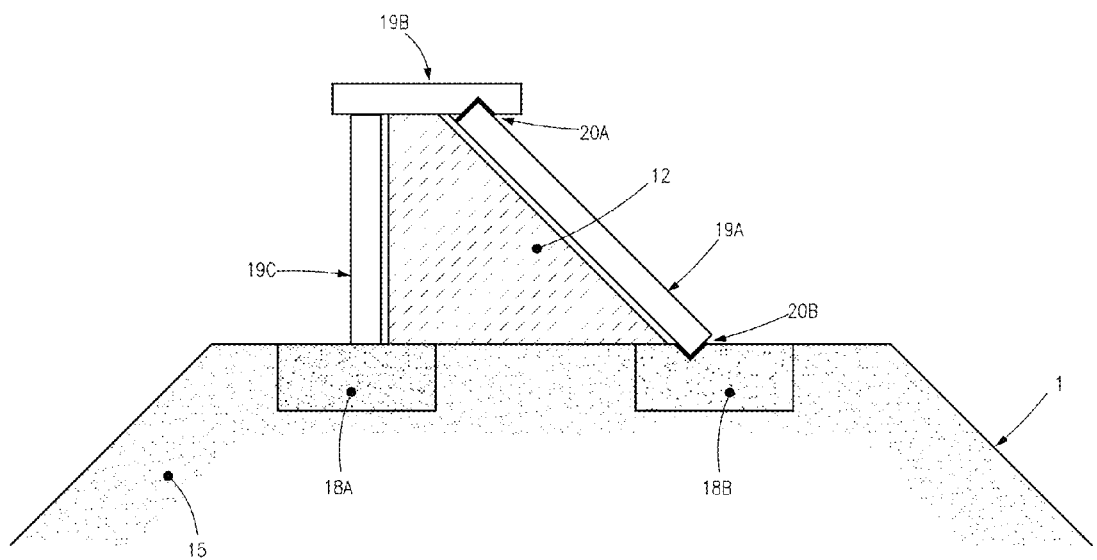
FIG-7 TYPICAL SECTION, EMBODIMENT-C, ARMORED AS LINER

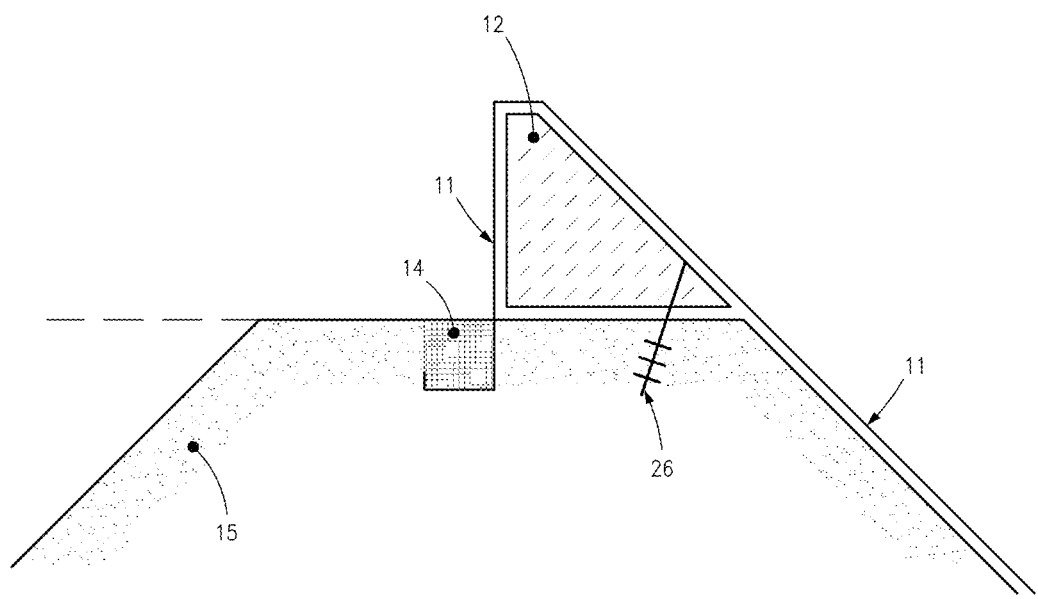
FIG-8 EMBODIMENT-D NEW LINER

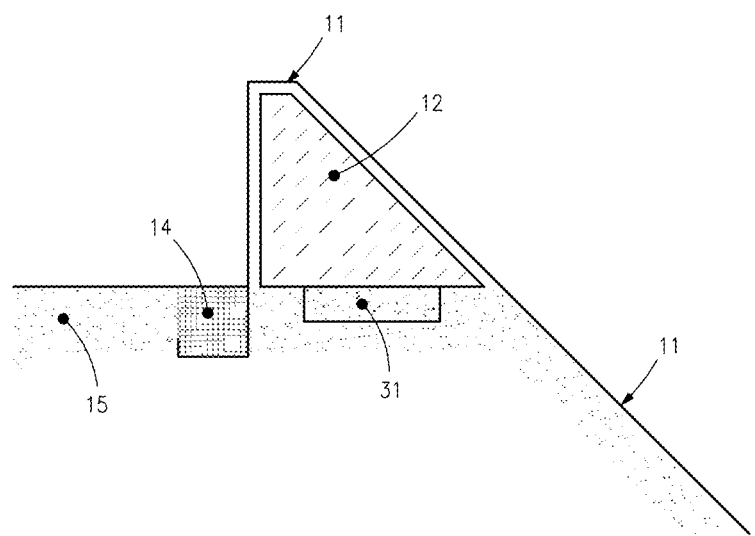
FIG-9 CONCRETE FOUNDATION

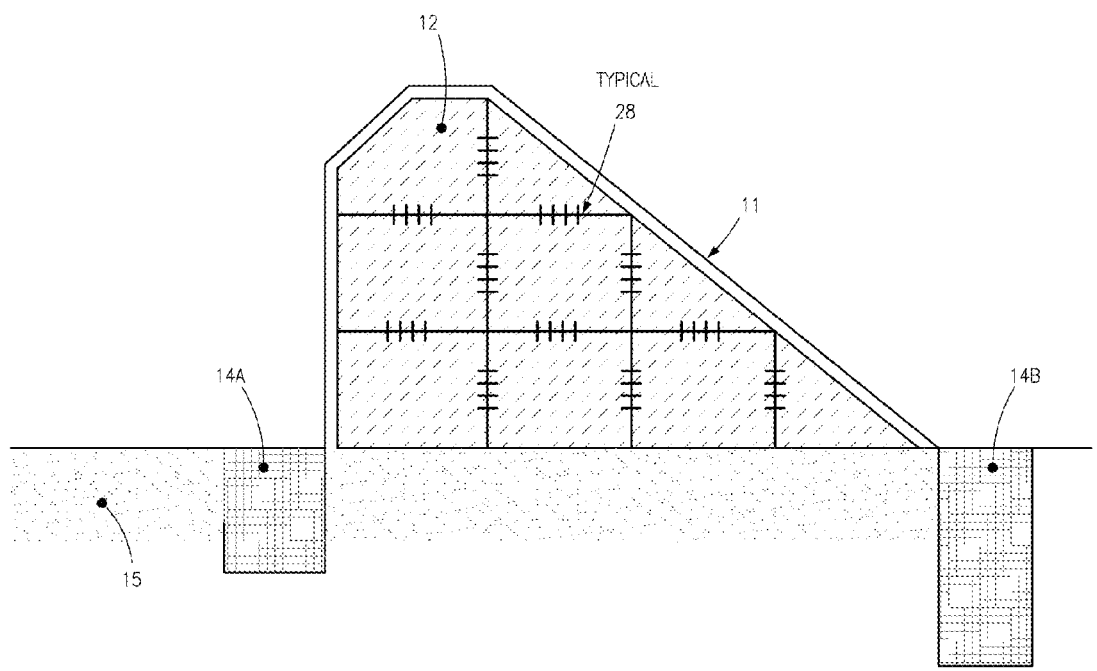
FIG-10 STACKED CONFIGURATION EMBODIMMENT-E

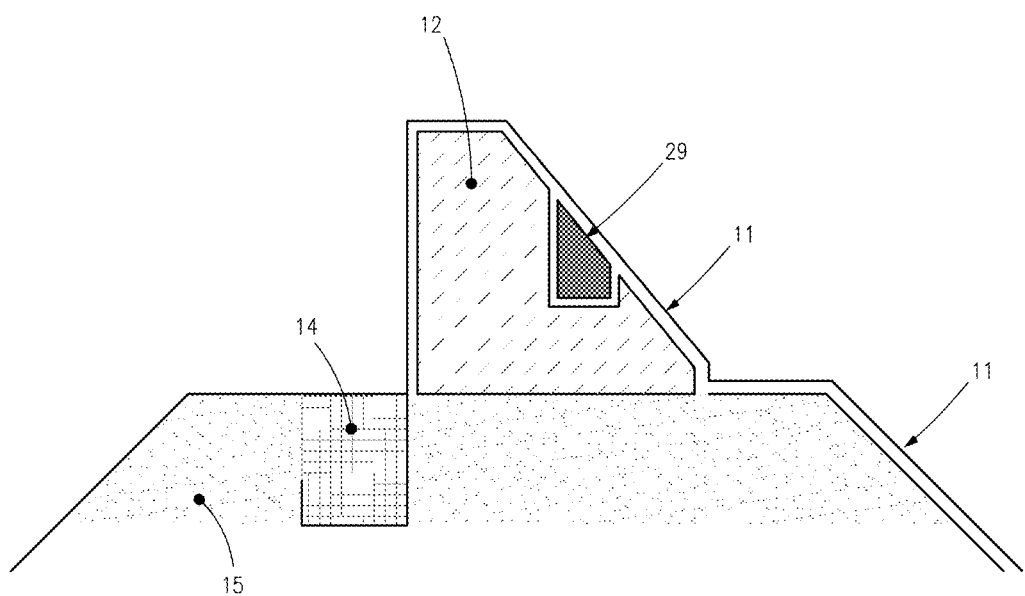
FIG-11 WEIGHTED SECTION, EMBODIMENT-F

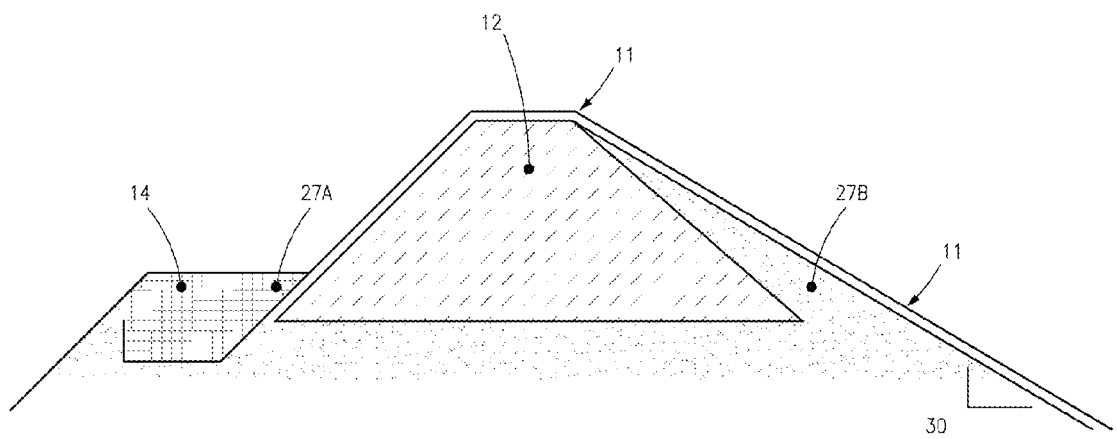
FIG-12 TWO SOIL ANCHOR POINTS

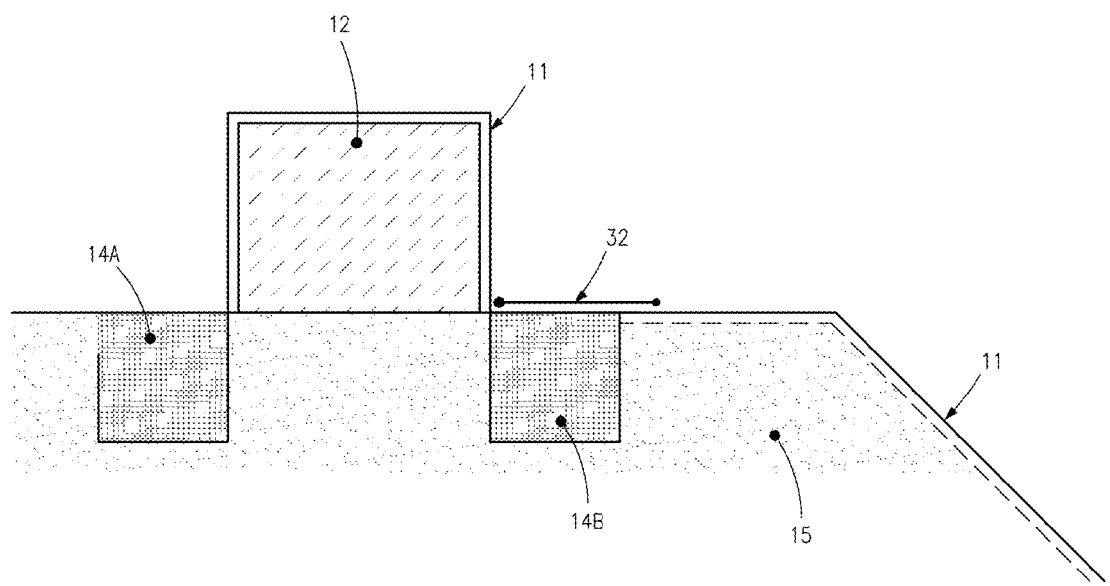
FIG-13 TWO ANCHOR TRENCHES

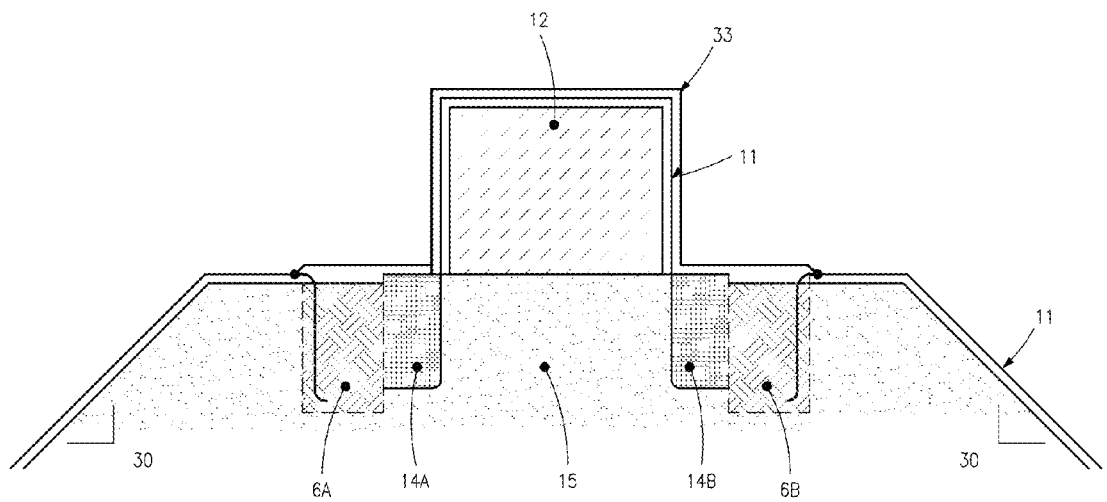
FIG-14 INTERIOR LEVEE (CONTAINED FLOUID ON BOTH SIDES)

BERM OR LEVEE EXPANSION SYSTEM AND METHOD

RELATED DOCUMENTS

This application claims the benefit and priority to provisional application entitled "Berm or Levee Expansion System and Method, Application No. 62/008,662 filed Jun. 6, 2014. This provisional application is incorporated herein by reference in its entirety.

1. FIELD OF USE

The method and system of this disclosure pertains to economical expansion of capacity of liquid retention structures such as levees, retention ponds and similar structures. The expansion of capacity can be achieved with an expedited construction schedule.

2. BACKGROUND OF THE DISCLOSURE

Embankments are widely used in civil, industrial, and municipal applications for reservoirs for the retention and storage of fluids. As used in this disclosure, embankments, levees, retention dikes, dams and berms will collectively be referred to as berms. The fluids stored by these berms can range from storm water to hazardous materials such as fracing water or industrial process by-products. Industrial reservoirs are typically land-locked within existing facilities with little or no room to expand the reservoir in a horizontal direction due to adjacent structures, property owners, buried utilizes, etc. The need for additional reservoir volume capacity may occur for multiple reasons, including but not limited to expansions in process or treatment requirements. For the reasons described above, facility owners are faced with limited options to increase reservoir capacity.

One application of industrial reservoirs is the surface storage of brine solution at salt dome storage facilities. These facilities store hydrocarbon products in underground caverns that have been formed by dissolving salt deposits from naturally occurring salt dome formations. The brine solution is pumped underground to displace the hydrocarbon products out of the storage and into the facility for distribution to downstream facilities. When new product is pumped into the cavern, the brine is displaced through pipe systems to the surface storage reservoirs.

In the State of Texas, for example, regulations require an operating freeboard of 2 to 3 feet between the maximum operating fluid elevation and the top of the berm. Because this freeboard is by nature at the top of the berm and at the widest part of the levee (due to the sloping berm walls as described below), the storage lost to the freeboard requirement can be over 13% of the total available capacity of the reservoir. These reservoir are typically installed to utilize the maximum available footprint and cannot be easily expanded. Land restrictions make it difficult or impossible to add additional reservoirs. It is also expensive to remove and build a new berm wall constructed of soil.

Berms are also common in stationary flood control structures such as levees and dams. There are an estimated 100,000 miles of levees in the United States alone. It is sometimes necessary to raise the effective fluid retention height of these levees due to increases in upstream development that lead to increased runoff and therefore increased flood elevations. This is traditionally done by adding soil to the levee, constructing concrete barrier walls, or adding a gravity fill structure to the crest of the levee. These gravity fill systems rely on the weight of the added structure to resist the fluid pressures from the contained fluid.

SUMMARY OF THE DISCLOSURE

This disclosure teaches a method and system that can regain the pond storage lost by adding berm height and therefore the required freeboard capacity. In this regard, this disclosure can directly help America's energy delivery and storage systems. By simply adding 3-4 feet of berm height to multiple existing ponds, a significant increase in storage capacity can be realized.

In a broad aspect, the disclosure is directed to a fluid retention method and system. In one specific sense, the disclosure relates to raising the height of new or existing berms by installation of the proposed structure/system on top of an existing engineered berm. The method and apparatus of the disclosure pertains to erecting a structure consisting of a unique combination of lightweight fill material at least partially enclosed by an impervious fluid liner material. The fluid liner material will be attached to a new or existing liner positioned on the face of the berm, or otherwise be made impervious by anchoring into or against the existing structure. The proposed structure has no length limit. The lightweight fill structure can be installed around the full perimeter of the berm crest ground surface (the top of the berm surrounding an enclosed pond) or along the full length of a levee. The proposed system (impervious fluid liner and lightweight fill structure) effectively increases the height of the inner sidewall of a levee. This increased height may comprise a regulatory required freeboard for the berm structure, i.e., acting as a barrier only during temporary elevation of the fluid level in the retention pond, etc.

The unique combination of materials creates a system that can be installed where traditional earthen, sheetpile, or concrete structures are not feasible or cannot be constructed due to physical limitations such as equipment access, geotechnical concerns, or other constraints.

The lightweight fill material may be comprised of Expanded Polystyrene (EPS), commonly referred to as Geofoam®, or a similar lightweight rigid foam plastic material. Geofoam is a registered trademark of Minova International Limited United Kingdom. Materials having physical characteristics of: density less than 5 pounds per cubic foot, compressive strength greater than 2 psi, and a flexural strength greater than 10 psi can be utilized. These materials will hereinafter be referred to as "lightweight fill material". The liner will typically be High Density Polypropylene (HDPE), although other liner materials such as LDPE, PVC, and polyurea composites (e.g. geotextiles coated with polyurea) are commercially available. HDPE liner thicknesses of 30-120 mils would be typically used for the fluid impermeable liner. These materials may be referred to as liner materials or as fluid impermeable liner material. These materials typically have physical characteristics of: yield strength greater than 60 pounds per inch (per ASTM D 6693), puncture resistance greater than 45 pounds (per ASTM D 4833), and are stabilized for protection against ultraviolet sun damage. A textured surface is available on many liner products and would be desirable in this application, specifically as the textured surface increases the coefficient of friction against any surface the liner is in contact with.

The lightweight fill material has a structure. The structure's cross sectional shape would typically be triangular, with approximately 45 degree interior slope and a vertical face on the exterior face. Other shapes, however, are not excluded. The height and width of the structure can vary to fit the physical limitations of the specific installation and are limited by the physical strength of the liner and lightweight fill material, the fluid being contained, and the characteristic of the underlying berm. It will be appreciated that berms are engineered structures with load limits. A typical installation would be no more than 6 feet tall although taller installations are possible.

The basic installation on an existing earthen berm with an existing impervious HDPE liner system would entail the following activities.

1. Excavation of an anchor trench at the berm crest (or ground surface) for the new liner that will enclose the Light weight fill material
2. Cleaning the existing primary liner.
3. Temporarily placing the new liner along the berm crest.
4. Attach the new liner to the existing liner by extrusion weld or other adhesive or mechanical methods.
5. Layback new liner to allow placement of Light weight fill material.
6. Placing Light weight fill material along the berm crest (ground surface).
7. Flip liner over the light weight fill material and install outside edge into anchor trench.
8. Backfill anchor trench.

Another aspect of the disclosure relates to partially enclosing the lightweight material with a liner material that is embedded and anchored into natural grade (ground surface) or an existing earthen berm. In this case the earthen anchor trench will provide the required tensile connection to the liner that is required to prevent movement or overturning of the lightweight fill material. The anchor trench can be specifically designed to optimize the liner embedment into the existing soils in order to maximize the impervious characteristics of the subgrade portion of the assembly. The liner can partially act as an embedded cutoff wall when installed vertically into an anchor trench.

Another aspect of the disclosure is that it provides flexibility in the application of the liner material. Any material that provides the necessary strength to resist overturning and movement of the lightweight fill material (hereinafter "lightweight fill material") could be utilized in order to vary the durability, appearance, and design life of the system. One embodiment of this flexibility would be the application of shotcrete over an impervious HDPE liner. Shotcrete is concrete conveyed through a hose and pneumatically projected at high velocity onto a surface. Shotcrete undergoes placement and compaction at the same time due to the force with which it is projected from the nozzle. It can be impacted onto any type or shape of surface, including vertical or overhead areas The shotcrete would provide a concrete protective layer to protect the assembly from vandalism, accidental impacts, and prevent UV damage to the HDPE liner. This level of protection would be desirable in publicly accessible areas or areas without controlled access, such as public flood control levees. Traditional cast in place concrete or precast concrete panels could also be utilized to provide alternate armoring systems and vary the visual appearance of the system.

Another aspect of the disclosure relates to its minimal weight when compared to traditional methods of constructing berms or raising berms. Traditional methods of raising berms require the addition of structural fill, construction of concrete foundations and wall systems, or the installation of a container to hold a material of sufficient weight to resist the lateral fluid pressures imposed by the retained fluid. This additional weight, in some instances could not be supported by the underlying foundation soils, e.g., the load exceeds the engineered limits of the existing. This makes traditional methods impossible to implement. The disclosed structure and method eliminates these weight concerns as the liner material provides the structural capacity required to resist the lateral fluid pressures. The system does not rely on fluid pressure or the weight of the fill material or contained fluid to seal the liner to the existing soil or to other sections of the liner.

BRIEF DESCRIPTION OF THE DRAWINGS

The accompanying drawings, which are incorporated in and constitute a part of the specification, illustrate preferred embodiments of the disclosure. These drawings, together with the general description of the disclosure given above and the detailed description of the preferred embodiments given below, serve to explain the principles of the disclosure.

FIG. 1 is a typical cross section of a reservoir constructed by excavating the inner portion of the pond below natural grade and utilizing the excavated material to construct earth embankments. The top of the embankment is shown in FIG. 2.

FIG. 2 is a typical cross section of an embankment with two layers of impervious liners (double lined levee). Also shown are two anchor structures for retain the flexible impervious liners.

FIG. 3 shows Embodiment A of the disclosure where the new impervious liner is joined to an existing liner. A former anchor is illustrated with two additional anchors. The anchors may be trenches dug in the top of the ground berm and filled with additional earth, gravel or concrete.

FIG. 4 shows a typical cross section of an existing earthen levee (berm) constructed of compacted soil material.

FIG. 5 shows Embodiment B of the disclosure where the new impervious liner is anchored into existing soil. In this embodiment, the liner may be buried in one or more trenches dug in the top of the earthen berm.

FIG. 6 shows a typical cross section of Embodiment B, with the addition of an armored surface composed of concrete placed over the added berm material.

FIG. 7 shows a typical section of Embodiment C, where the armored surface acts as the impervious liner. The armored surface contains the added shaped berm layer. Footers may also be installed to support the armored layer.

FIG. 8 shows Embodiment D of the system in which the impervious liner 11, is extended to the interior of the berm and is continuous with, and acts as the primary liner for the entire pond. Also shown is a mechanical anchor to secure the added berm material to the earthen berm surface.

FIG. 9 shows the light weight fill material bonded to a concrete foundation as a means of anchoring the system (added berm material and imperious liner) against lateral movement towards the interior (fluid side of the berm surface).

FIG. 10 shows Embodiment E of the system which incorporates a multitude of individual lightweight fill blocks to form a singular larger block. The embodiment shows multiple mechanical anchors assisting in securing the fill blocks together. Trenches are shown for anchoring the impervious liner.

FIG. 11 illustrates an embodiment wherein the lightweight fill material is supplemented with a preformed higher density mass that fits within an indentation of the fill material structure. The higher density mass may extend across a plurality of light weight material sections.

FIG. 12 illustrates an embodiment wherein the lightweight fill material is anchored by soil or other fill material on both sides of the structure. Also the slope of the berm is extended at at least a portion of the material structure. An anchor structure is also shown on the back side (non fluid side) of the berm.

FIG. 13 illustrates an embodiment where the lightweight fill material is anchored by the impervious liner and the liner is anchored by a trench constructed on both sides of the lightweight fill material structure.

FIG. 14 illustrates a cross section of an interior berm, i.e., a berm with contained fluids on each side. Elevation of this structure requires bonding of the new liner to an existing liner on each side of the lightweight fill and introduces unique structural load situations and/or constructability requirements. In this embodiment a double layers of a fluid impervious liner may be used with the inner anchored in a trench dug in the top of the berm surface and the outer liner layer covering the trench surface.

DETAILED DESCRIPTION AND SPECIFIC EMBODIMENTS

It will be appreciated that not all embodiments of the disclosure can be disclosed within the scope of this document and that additional embodiments of the disclosure will become apparent to persons skilled in the technology after reading this disclosure. These additional embodiments are claimed within the scope of this disclosure.

It should be noted that each installation of this system will present unique engineering challenges that will require customization of the system. These may include, but are not limited to, provision of personnel access routes, pipe penetrations, and custom fitting around existing structures. These are impossible to predict and will vary with the existing conditions and equipment at the individual installation locations. The scope of the Applicant's disclosure is adaptable to each unique engineering challenge by combination of the disclosed systems.

It will be appreciated that retention ponds do not experience a fluid current. The disclosure, however, is also applicable to levees retaining flowing fluid, e.g. water. A current creates a force parallel with the face of the lightweight fill material, i.e., the surface of the lightweight fill material facing the fluid. A current may also be experienced at the inlet or outfall of a retention pond. In such applications, it may be advantageous to utilize anchors that penetrate the lightweight fill materials and extend into the soil comprising the berm. An example of this is shown in FIG. 8. In another embodiment, FIG. 7 shows a concrete layer in front of the lightweight fill material. In one embodiment, the concrete layer faces only the fluid.

FIG. 1 is a cross section of an existing reservoir that demonstrates a potential application of the system. This type of reservoir is typically constructed by excavating an area 21, below the existing ground surface of the site. This excavated material may be utilized to construct the berm 1, if it is of suitable geotechnical characteristics, or may be disposed of in another location. The berm 1, may also be constructed of imported fill material of suitable characteristics. The fluid surface 2, is shown for reference. The fluid surface 2, cannot become higher than the top elevation of berm 1. If fluid surface 2 overtops berm 1, significant damage and potential catastrophic failure of the berm can result. Existing surface grade surrounding the berm 3, is shown for reference. Dimension 4 represents the total footprint of the reservoir formed by the berm. This dimension is often constrained by adjacent structures, utilities, or property lines and cannot be increased. It is also expensive to construct earthen berms. In a scenario where dimension 4 is constrained, there are limited options to raise the height of berm 1 as the berms have been designed per specific slope stability calculations and an increase of weight caused by adding fill or heavy barriers to the crest of berm to increase the berm height could affect the slope stability or the underlying existing surface 3 to create an unstable geotechnical condition. (See also FIG. 4 and the paragraph within the DETAILED DESCRIPTION AND SPECIFIC EMBODIMENTS beginning with the text stating "Figure 4 shows a cross section of a typical earthen perm".)

FIG. 2 shows a typical cross section of a berm crest that has a double liner system installed. The fluid surface 2 is shown for reference. The distance between the fluid surface 2 and the crest of the berm is shown as dimension 10, commonly referred to as freeboard. Freeboard heights are sometimes regulated by government agencies to provide additional storage capacity for extreme rainfall events, system failures, or other events that could quickly increase the elevation of the fluid surface and result in overtopping of the berm 1. In an embodiment, the lightweight fill material subject of this disclosure (positioned on top of the berm) may comprise the required freeboard. (See FIG. 3)

The double liner is typically installed in instances where little or no leakage of the fluid is desired or permitted by law. The double liner consists of a Primary Liner, 7 that is the primary impervious layer in the system. Liner 7 is typically terminated in an anchor trench 6A, placed along the berm crest. The anchor trenches 6A and 6B are engineered to provide adequate soil mass to prevent pullout or displacement of the respective liners 7 and 9 and can also anchor the drainage layer 8. The Primary Liner may be the top liner of the double liner system. Two anchor trenches 6A and 6B are shown. One anchor trench 6B may be used to secure the Secondary Liner. The anchor trench stabilizes the liner against displacement and is typically backfilled with compacted soil. Secondary Liner 9, provides a backup impervious liner and enables installation of leak detections systems to determine the quantity of leakage through the primary liner. A drainage layer 8, is typically installed between liners 7 & 9 to cushion and protect the primary liner and to provide means for leakage through the primary liner to be directed and collected in a leak detection system. The drainage layer can be constructed of a sand layer or a synthetic material such as a geonet.

Liners 7 & 9 are typically constructed of High Density Polypropylene (HDPE), Low Density Polypropylene (LDPE), Polyvinyl Chloride (PVC), poly urea composites, or polyethylene. They are installed to form a continuous liner in the reservoir.

This double liner system presents challenges to any attempt to raise the height of the existing levee as the integrity of the anchor trenches and liners must be preserved to maintain the system.

FIG. 3 shows Embodiment A of the proposed system. The drainage layer 8 is omitted from this view for clarity. A new anchor trench 14, is shown along the exterior edge of the proposed system. The new anchor trench is installed along the existing berm crest in a manner that does not disturb (or minimally disturbs) the existing anchor trench, 6A. A lightweight fill material 12, is shown placed along the berm crest. This lightweight fill material forms the structural core of the extended berm height system. The lightweight fill material is typically installed in lengths that are 8-10 feet long (sections) and do not require direct attachment to each other. The light weight fill material may be constructed of a foam type material as described previously. A new liner 11, partially encloses the fill 12, and is attached to the existing liner 7, by mechanical bonding, welding, adhesives or mechanical fastening at point 13. The attachment must provide sufficient strength to join the two liners and secure the position of the lightweight fill material. The attachment must also be fluid impervious to maintain the integrity of the liner system. The combination of liner 7, and the attachment point 13, and anchor trench 14, form the structural anchor system that enables the lightweight fill to adequately resist the fluid pressure 22, which results from the fluid elevation 2 acting upon the structure. Items 7, 13, and 14 (liner, liner attachment point, and anchor trench) also form the means of joining the system into a continuous structure. The system eliminates the need for directly connecting the lightweight fill material sections. This method does not disturb the secondary liner 9 or its anchor trench 6B.

FIG. 4 shows a cross section of a typical earthen berm. Berms are commonly constructed of compacted earth fill 15. The compacted earth fill is of suitable geotechnical characteristics to contain the fluid and maintain the structural integrity of the berm against hydrostatic pressures. These berms may be constrained by the underlying foundation soils. There may be instances where the bearing capacity of the foundation soils limits the weight (and therefore the height) of the levee to be constructed on top of the foundation soils. The height can also be constrained by the available footprint of the berm, shown as dimension 23. The interior slope 24A and exterior slopes 24B of the berm, are limited in their degree of steepness by the soil characteristics of the earth fill 15. This slope limits the height within the footprint 23. The berm crest 25, is typically limited to how narrow it can be due to constructability of the berm itself as related to equipment access during construction. The berm crest may also facilitate installation of equipment, roadways, pedestrian paths, or routes for inspection of the berm.

FIG. 5 shows Embodiment B of the disclosure. In this version, the new anchor trenches 14A and 14B, are utilized to anchor the impervious liner, 11 into the existing soil. Note that this existing soil (compacted earth fill 15) may be part of an existing berm 1 or could be natural grade in instances where a berm does not exist. The lightweight fill material 12, forms the structural core of the system while the liner 11, and anchor trenches 14 form the system that anchors the system and provides the impervious nature of the system. This embodiment could provide economical means of effectively raising the height of an existing berm, or facilitate the construction of a levee where none existed previously. This embodiment is unique in that it does not require an existing impervious liner to be present. In this embodiment, the liner could be, but is not limited to the materials discussed above such as HDPE, LDPE, PVC, poly urea, or polyethylene. In one embodiment, the impervious liner has tensile strength of 168 pounds per inch and puncture resistance of 90 lbs.

FIG. 6 shows a version of embodiment B with the addition of an armored facing (protective structure 17). This version would be desirable for use in areas where protection against fluid flow, vandalism, impact, or UV degradation of the liner material was desirable. In this version the anchor trenches 14A and 14B, lightweight fill 12, and impervious liner 11, are installed in the same manner as above. A protective structure 17 could be installed by placement of a reinforcing steel 16 (Welded Wire Fabric or Rebar) along the liner 11. Concrete could then be placed over the liner and enclosing the reinforcing by means of shotcrete placement, where concrete is sprayed onto a structure. Shotcrete is, in effect, a version of a cast-in-place concrete wall. Rather than placing concrete into forms, however, a fresh mix is sprayed onto wall panels that have been erected in the shape of the structure. Concrete is applied from a pressurized hose to encompass the reinforcement and build up the wall thickness, forming structural shapes that include structural shape or assemblies. These can be constructed over the lightweight fill material. Polystyrene is a common surface for accepting fresh concrete. This method of concrete placement is well known in the industry, and is only one example of how concrete could be placed for protection of the system. The concrete structure 17, would ideally extend below grade to provide additional protection.

FIG. 7 shows embodiment C of the system in which the protective structure 19A, 19B, and 19C would be installed in sections and joined sealed together at the joints with sealant 20A and 20B, to form the impervious liner. This method demonstrates the use of an alternate material to anchor the lightweight fill and provide the impermeable liner. As it would require the installation of foundations 18A and 18B, and either the fabrication of the armor panels 19A-19C or the utilization of cast in place concrete, it is envisaged that this embodiment would not be as economical as other embodiments. In this embodiment, the protective armor could feasibly be any material which would be of impervious nature, of sufficient structural strength, and incorporate the ability to be joined together to create impervious joints.

FIG. 8 shows Embodiment D of the system in which the impervious liner 11, is extended to the interior of the berm and is continuous with, and acts as the primary liner for the entire pond. This embodiment would be typical of using the system in a newly constructed pond, without the need to bond or join the liner 11 to an existing liner 7, as shown in FIG. 3. In this embodiment, the addition of a mechanical anchor 26, would be desirable to anchor the lightweight fill 12, in instances where the reservoir was empty and the liner would have no fluid pressure acting to prevent movement of the system towards the pond interior.

As an alternate to the mechanical anchor, the foam could be bonded adhesively or mechanically to a concrete foundation or other rigid material 31 as a means of anchoring the system against movement towards the interior. This detail is shown in FIG. 9. The rigid material 31, would lock the lightweight fill into place and prevent movement towards the pond interior as a result of an external force such as wind or impact. This configuration would also provide additional resistance to overturning due to the weight of the rigid material. The rigid material could be buried and mechanically anchored to the lightweight fill.

FIG. 12 shows a further embodiment of FIGS. 8 and 9, wherein an arrangement with a soil anchor point 27 is created, on both sides of the lightweight fill 12. This detail shows the soil on the inner face of the lightweight fill extending along the face of the lightweight fill to anchor the block and to provide a continuous interior slope 30, against which to place the impervious liner 11. This arrangement may be desirable to better anchor the lightweight fill in Embodiment D of the system. The soil anchor point 27, could be installed on one side only, and the cross section and shape of the soil anchor could vary according to the unique properties of each installation.

FIG. 13 shows another arrangement of Embodiment D, in which an anchor trench 14A and 14B, is installed on both sides of the lightweight fill material, 12. This arrangement would fully anchor the lightweight fill against lateral movement. It would also provide the benefit of a traditional anchor trench for the impervious liner 11. This may be desirable in instances where the forces exerted by the liner (due to thermal expansion/contraction) may be greater than the resistance available by the lightweight fill 11, and the previously mentioned mechanical anchors, 26. An anchor trench cover 32 may be desirable to prevent erosion and saturation of the interior anchor trench 14 by the contained fluid. The anchor trench cover 32 could be constructed from the same material as the liner 11 and attached by mechanical, welding, or adhesive means to the liner 11. The anchor trench cover 32 could be an alternate type of liner or a thinner section of liner, as it will likely not function as a structural member.

In another embodiment illustrated in FIG. 14, the system may be installed on an interior berm. An interior berm is defined a berm with contained fluids on each side, as would be the case in a berm dividing a larger basin into two separate basins. This situation could present a situation that would require bonding of the new liner 11 to an existing liner 7 on each side of the lightweight fill and introduce unique structural load situations or constructability requirements. One alternative in this situation is to install the primary liner 11 embedded into anchor trenches 14A and 14B in order to provide structural integrity to the system. A containment liner 33, would then be bonded (adhesively or mechanically) to the existing liner on either side of the system. This liner 33, could also be bonded to the liner 11 in order to provide additional strength and prevent liner movement in the wind. The new anchor trenches 14A and 14B may need to be constructed in a way to minimally disturb existing anchor trenches 6A and 6B.

FIG. 10 shows Embodiment E of the system that incorporates a multitude of individual lightweight fill block sections to form a singular larger block. The individual blocks 12, would be joined via mechanical anchors 28, which are commercially available and typical to the installation of multiple layers of Light weight fill material blocks. The height of this system would be limited by the strength of the liner material 11, the strength of the anchor trenches 14A and 14B, and potentially the strength of the lightweight fill material. This embodiment could also be utilized as in FIG. 3, where the liner 11 is connected to an existing liner 7, or as shown in FIG. 8 where utilized with a continuous liner. The downward force applied by the liner material will act to compress the blocks together and cause them to act as a singular block in conjunction with the mechanical anchors. As an alternative to the mechanical anchors 28, the blocks 12, could be joined together with a compatible adhesive. This adhesive would cause the individual blocks to act as a singular block. In another embodiment, (not shown) the individual block sections could be over lapped across the lower joints of two separate section, thereby increasing the structural unity of the length of multiple block sections comprising the lightweight fill material.

Embodiment A (FIG. 3) could be constructed to allow the addition of a leak collection and detection system in between the existing primary liner 7 and the new liner 11. This could be required to satisfy certain regulatory requirements or provide a means of monitoring the integrity of the attachment point 13. A leak detection system could be provided for any of the embodiments. A leak detection system is traditionally constructed of perforated pipe (typically PVC or HDPE) installed to collect any fluid that leaks from the containment system, in this case, through liner 11 or attachment point 13. The collected fluid is routed to a collection sump where it can be monitored or pumped back into the containment area.

Embodiment A could also be constructed by adding a second impervious liner over liner 11 and providing an additional attachment point to the existing liner and an installing the second liner into the anchor trench 14.

Embodiment E or B (FIG. 10 or 5) could be constructed also with the addition of a second impervious liner over liner 11 and the addition of a new anchor trench on each side of the system. This would provide a secondary liner and provide additional safety factor into the strength of the system against overturning.

FIG. 11 shows Embodiment F of the system that incorporates a high mass insert to provide additional resistance to horizontal displacement and overturning of the system.

In this embodiment the weight of the light weight fill material structure is supplemented by the addition of more dense material. The high mass insert 29, could be constructed of any material of sufficient density to provide the required resistance to displacement or overturning. This supplemental mass can be concrete poured and cured in a mold wherein the shape of the mold is complementary to an indentation formed within the structure of the lightweight fill material. Materials such as sand bags, geo-tubes, and steel shapes, would be examples of materials also available. As this method would require the use of additional materials, it is envisaged that this embodiment would not be as economical as other embodiments. It will be appreciated that the lightweight fill material is transported and positioned at the berm crest without the supplemental weight. The weight can be added after the structure is in position. In one embodiment, the weight may be less than 100 lbs. and manually positioned into the structure. It will be appreciated that a structure can have multiple indentations to receive the supplemental weight. The advantage of this system will be to allow the structure to have increased mass without requiring mechanical equipment, e.g., mechanical lifting equipment or carrying equipment, to be brought to the site. (The supplemental mass may be manually placed within the structure.) It will be appreciated that access to the site of the berm may be restricted. Illustrated is the lightweight fill material structure 12 and the supplemental mass 29 fitting into an indenture of the fill structure. The high mass insert 29, could be anchored or bonded to the lightweight fill material 12. Also illustrated is the anchoring trench 14 containing the end of the liner 11 that is placed over the fill structure and continues to cover the inner surface of the berm.

In another embodiment, the lightweight fill sections can be joined together end to end. This is particularly useful when the lightweight fill material comprise sections of expanded polystyrene (EPS) or a similar lightweight rigid foam plastic material. The lightweight fill material (components or sections) are prefabricated offsite into selected shapes. Each section can be between 6 and 30 feet in length. Other dimensions are possible. The sections can be variable in height. The lower portion of the section can be broader than the upper section to enhance stability. The sections can be placed end to end on the berm crest.

The ends of the lightweight fill material sections can be joined together. This can be accomplished by inserting rebar into each end or using commercially available anchors as in embodiment E. In one embodiment, the length of rebar inserted into each section can be 4 to 24 inches. The rebar can be precut, thereby facilitating prompt assembly in the field. Each juncture can be linked together by multiple sections of rebar. It will be appreciated that the linking together of each component will prevent one component or section of lightweight fill material from being pushed out of line, causing a gap to form in the extended height berm subject of this disclosure. The rebar can be fitted into indentations or holes within section ends of the lightweight fill material. It will be appreciated that the length of the rebar section, preferably greater than 20 inches, will improve the stability of the junction between two sections of the lightweight fill material. The greater unified length of the lightweight fill sections will protect against a localized surge in fluid level and help to facilitate construction by anchoring the lightweight fill material sections together prior to anchoring them by enclosing them with the liner 11. Multiple lightweight fill sections could also be joined together using continuous steel cables inserted lengthwise through preformed penetrations in each section of the lightweight fill material. This steel cable could be mechanically anchored to the existing berm to provide additional structural stability. The cable diameter, material of construction and spacing of the mechanical anchors would depend on the specific design parameter of each installation.

In another embodiment, the ends of each lightweight fill material are modified in the manufacturing process to create male and female protrusions and indentations at each end. Therefore one end of the lightweight fill component would contain a male protrusion and the other end would contain a female indentation. The indentations and protrusions would be complementary dimensioned to allow the male end of a first component to fit into the female end of a second component. As with the joining the ends with rebar, the joined sections of lightweight fill material would prevent one section from being pushed back. In both cases (rebar linkage or male/female end coupling), the series of lightweight fill material would act as a unified structure or barrier.

In another embodiment the lightweight fill materials completely surround a retention pond. Therefore the ends of each section of lightweight fill material abut the end of another section. In another embodiment where the lightweight fill material forms a levee structure, the series of sections of lightweight fill material may end where the ground level exceeds a specified elevation. The end section may be dug into the ground at the point that the ground level exceeds the specified elevation. This would serve to anchor the end of the section linked in accordance with a preceding paragraph beginning with the text stating "Figure 12 shows a further embodiment of Figures 8 and 9, wherein an arrangement with a soil anchor point 27 is created, on both sides of the lightweight fill 12".

This specification is to be construed as illustrative only and is for the purpose of teaching those skilled in the art the manner of carrying out the disclosure. It is to be understood that the forms of the disclosure herein shown and described are to be taken as the presently preferred embodiments. As already stated, various changes may be made in the shape, size and arrangement of components or adjustments made in the steps of the method without departing from the scope of this disclosure. For example, equivalent elements may be substituted for those illustrated and described herein and certain features of the disclosure may be utilized independently of the use of other features, all as would be apparent to one skilled in the art after having the benefit of this description of the disclosure.

While specific embodiments have been illustrated and described, numerous modifications are possible without departing from the spirit of the disclosure, and the scope of protection is only limited by the scope of the accompanying claims.

What I claim is:

1. A method of elevating the height a liquid retention berm comprising:
    a) attaching a first liquid impermeable liner to a top edge of an existing second liner wherein the combined first and second liner is continuously covering an interior surface of a berm adjacent to a retained liquid;
    b) placing the combined first and second impermeable liner wherein the combined liner is covering a lightweight rigid foam material having density less than 5 pounds per cubic foot, compressive strength greater than 2 psi, and a flexural strength greater than 10 psi on a top ground surface of the berm;
    c) elevating the height of the top of the berm with the lightweight rigid foam material; and
    d) securing the lightweight rigid foam material with the combined first liquid impermeable liner to resist horizontal forces and buoyant uplift forces.

2. The method of claim 1 further comprising anchoring the first liquid impermeable liner in a trench constructed in the berm.

3. The method of claim 1 further comprising attaching the first continuous liquid impermeable liner to the existing second liner by bonding or adhesively binding, or by mechanical attachment.

4. A method of elevating the height of a berm comprising placing light weight rigid foam material having a density less than 5 pounds per cubic foot, compressive strength greater than 2 psi, and a flexural strength greater than 10 psi and further comprising covering a liquid impermeable liner over the lightweight rigid foam material; and anchoring the lightweight rigid foam material from horizontal loads and vertical buoyant forces.

5. The method of claim 4 further comprising covering the liquid impermeable liner wherein the liquid impermeable liner may be at least one of the following materials: High Density Polypropylene (HDPE), Low Density Polypropylene (LDPE), PVC, and polyurea composites comprising a geotextile coated with polyurea, which secures the lightweight fill rigid foam material.

6. The method of claim 4 further comprising installing rebar with the lightweight rigid foam material.

7. The method of claim 4 further comprising anchoring the light weight rigid foam material with soil.

8. The method of claim 4 further comprising anchoring the light weight rigid foam material by installing a portion of the covering liquid impermeable liner in a trench constructed within the berm.

9. The method of claim 4 wherein the step of placing lightweight rigid foam material comprises installing expanded polystyrene.

10. The method of claim 4 further comprising covering the lightweight rigid foam material with an impermeable liner having a density greater or equal to 5 lbs per cubic foot.

11. A method of installing a height extension to an existing berm with an existing second impervious liner system comprising the steps:
    a) excavating an anchor trench at the berm crest for a first liner that will cover a lightweight rigid foam material;
    c) attaching the first liner to an existing second liner;
    d) laying back the first liner to allow placing of the lightweight rigid foam material on the berm crest wherein the lightweight rigid foam material has a density less than 5 pounds per cubic foot, compressive strength greater than 2 psi, and a flexural strength greater than 10 psi;

e) laying the first liner over the lightweight rigid foam material to hold the lightweight rigid foam material at the top of the berm; and f) installing an outside edge of the first liner into anchor trench.

12. A liquid retention berm height extension system comprising:
    a) a lightweight rigid foam material placed on a berm wherein the lightweight rigid foam material has a density of 5 pounds per cubic foot or less, compressive strength of 2 psi or greater, and a flexural strength of 10 psi or greater; and
    b) a first liquid impermeable liner placed over the lightweight rigid foam material wherein the first liquid impermeable liner secures the lightweight rigid foam material on the berm.

13. A liquid retention pond berm system comprising:
    a) a lightweight rigid foam material positioned on a top of a berm and the lightweight rigid foam material has a density less than 5 pounds per cubic foot, compressive strength greater than 2 psi, and a flexural strength greater than 10 psi;
    b) a liquid impermeable liner extending from a retention basin over and covering both the top of the berm and the lightweight rigid foam material where the fluid impermeable liner is structured to resist tension force to hold the lightweight rigid foam material in position relative to the berm.

14. The liquid retention pond barrier system of claim 13 further comprising mechanical anchors extending through the lightweight rigid foam material into a ground surface of the berm wherein the lightweight rigid foam material also contains plastic properties.

15. The liquid retention pond barrier system of claim 13 further comprising lightweight fill components wherein the lightweight fill components are sections of lightweight rigid foam material wherein each section can be joined with an additional section end to end.

16. The liquid retention pond barrier system of claim 15 wherein the adjoining ends of at least two sections can be joined by inserting one or more rebar sections across and into each section end.

17. The liquid retention pond barrier system of claim 16 wherein the length of the rebar positioned across and into each section end is 4 to 24 inches in length.

18. The liquid retention pond barrier system of claim 15 further comprising sealing the end of a lightweight rigid foam material section to an adjoining section end to create a liquid impermeable seal over which an impermeable liner can be positioned.

19. The liquid retention pond barrier system of claim 15 further comprising installing cast in place or precast concrete over at least one surface of the joined lightweight rigid foam material sections having a density less than 5 pounds per cubic foot, compressive strength greater than 2 psi, and a flexural strength greater than 10 psi wherein the material sections can be joined together by positioning of components including rebar extending across and into each adjoining lightweight rigid foam material section, insertion of sealing compounds between each concrete section, or positioning preformed lightweight rigid foam material sections wherein one end has a male joining component and the other end has a female joining component and the male joining component of one section is complementary sized and fits into the female joining component of the adjoining section.

20. The liquid retention pond barrier system of claim 15 where the lightweight rigid foam material sections have a density less than 5 pounds per cubic foot, compressive strength greater than 2 psi, and a flexural strength greater than 10 psi are joined together by a steel cable and the steel cable is mechanically anchored.

* * * * *